(12) United States Patent
Wu et al.

(10) Patent No.: US 11,541,530 B1
(45) Date of Patent: Jan. 3, 2023

(54) COMPLIANT MECHANISM FOR IMPROVING AXIAL LOAD SENSING IN ROBOTIC ACTUATORS

(71) Applicant: Harmonic Bionics, Inc., Austin, TX (US)

(72) Inventors: William Wu, Austin, TX (US); Rohit John Varghese, Austin, TX (US); Youngmok Yun, Austin, TX (US)

(73) Assignee: Harmonic Bionics, Inc., Austin, TX (US)

( * ) Notice: Subject to any disclaimer, the term of this patent is extended or adjusted under 35 U.S.C. 154(b) by 12 days.

(21) Appl. No.: 17/588,426

(22) Filed: Jan. 31, 2022

Related U.S. Application Data

(60) Provisional application No. 63/250,281, filed on Sep. 30, 2021.

(51) Int. Cl.
*B25J 9/00* (2006.01)
*B25J 13/08* (2006.01)
*A61H 1/02* (2006.01)

(52) U.S. Cl.
CPC .......... *B25J 9/0006* (2013.01); *A61H 1/0274* (2013.01); *B25J 13/085* (2013.01)

(58) Field of Classification Search
CPC ...................................................... B25J 9/006
See application file for complete search history.

(56) References Cited

U.S. PATENT DOCUMENTS

| | | | |
|---|---|---|---|
| 3,088,333 A | 5/1963 | Walton | |
| 3,214,999 A | 11/1965 | Lapp | |
| 3,613,457 A | 10/1971 | Davis et al. | |
| 3,985,025 A | 10/1976 | Ormond | |
| 4,547,119 A | 10/1985 | Chance et al. | |

(Continued)

FOREIGN PATENT DOCUMENTS

| | | |
|---|---|---|
| CA | 2741362 A1 | 4/2010 |
| EP | 2404713 A1 | 1/2012 |

(Continued)

OTHER PUBLICATIONS

Torque Transmission, "What is a Speed Reducer? How does a Speed Reducer work?," https://www.torquetrans.com/blog/how-a-speed-reducer-works, 2020, 6 pages.

(Continued)

*Primary Examiner* — LaToya M Louis
(74) *Attorney, Agent, or Firm* — Trop, Pruner & Hu, P.C.

(57) ABSTRACT

An embodiment includes an exoskeleton robotic system including: a first linkage; a bearing coupled to the first linkage; a joint including a motor configured to move the first linkage along the bearing; an axial load sensor configured to sense an axial force transmitted to the axial load sensor via the joint, the axial force including one of tension or compression but not torque; a bracket including first and second bracket locations and first and second arms; and a housing that includes at least part of the joint and which couples the bracket to the bearing. The bracket couples to the housing at the first bracket location and couples to the axial load sensor at the second bracket location. The first arm couples the second arm to the first bracket location, and the second arm couples the first arm to the second bracket location.

23 Claims, 11 Drawing Sheets

(56) References Cited

U.S. PATENT DOCUMENTS

| | | | |
|---|---|---|---|
| 5,155,423 A | | 10/1992 | Karlen et al. |
| 5,327,790 A | | 7/1994 | Levin et al. |
| 5,644,951 A | * | 7/1997 | Hatamura ............... F16H 25/24 |
| | | | 74/89.42 |
| 6,492,807 B2 | | 12/2002 | Spellman |
| 6,676,561 B2 | | 1/2004 | Fritzer et al. |
| 7,140,994 B2 | | 11/2006 | Mundis |
| 7,979,160 B2 | | 7/2011 | Teaford et al. |
| 8,683,876 B2 | | 4/2014 | Fujii et al. |
| 8,729,769 B2 | | 5/2014 | Takeuchi |
| 9,355,663 B1 | | 5/2016 | Harper et al. |
| 9,895,087 B2 | | 2/2018 | Lee et al. |
| 9,966,816 B2 | | 5/2018 | Kokubo et al. |
| 10,052,761 B2 | * | 8/2018 | Langenfeld ............ B25J 9/1638 |
| 10,143,570 B2 | | 12/2018 | Herr et al. |
| 10,335,959 B2 | | 7/2019 | Ogata |
| 10,463,560 B2 | | 11/2019 | Deshpande et al. |
| 10,732,060 B2 | | 8/2020 | Strauss |
| 10,903,725 B2 | | 1/2021 | Covington et al. |
| 11,147,731 B2 | | 10/2021 | Varghese et al. |
| 2011/0239788 A1 | | 10/2011 | Nagasaka et al. |
| 2011/0314950 A1 | | 12/2011 | Mamba |
| 2016/0201783 A1 | | 7/2016 | Miyake et al. |
| 2016/0296345 A1 | | 10/2016 | Deshpande et al. |
| 2017/0184190 A1 | | 6/2017 | Klassen |
| 2017/0321790 A1 | | 11/2017 | Klassen et al. |
| 2018/0274646 A1 | | 9/2018 | Sato et al. |
| 2019/0160658 A1 | | 5/2019 | Hutter et al. |
| 2019/0222103 A1 | | 7/2019 | Nedrehagen et al. |
| 2020/0281796 A1 | | 9/2020 | Lakany et al. |

FOREIGN PATENT DOCUMENTS

| | | |
|---|---|---|
| EP | 3067164 A2 | 9/2016 |
| WO | 2007136803 A2 | 11/2007 |
| WO | 2018064709 A1 | 4/2018 |
| WO | 2019002906 A1 | 1/2019 |

OTHER PUBLICATIONS

Metromatics, "Reaction Torque Sensor," https://metromatics.com.au/product/reaction-torque-sensor/, 2020, 6 pages.

Realpars, "Difference Between Absolute and Incremental Encoders?," https://realpars.com/absolute-vs-incremental-encoder/, 2020, 23 pages.

Motion Control Tips, Danielle Collins, "FAQ: How do magnetic encoders work?," https://www.motioncontroltips.com/faq-how-do-magnetic-encoders-work/, Nov. 13, 2015, 9 pages.

Honeywell, "Model QWLC-8M, Miniature Reaction Torque Transducer," https://measurementsensors.honeywell.com/ProductDocuments/Torque/Model_QWLC-8M_Datasheet.pdf, Jun. 2008, 4 pages.

Honeywell, "Honeywell Sensing and Control, Sensors for Test and Measurement," https://measurementsensors.honeywell.com/Pages/Product.aspx?pid=QWLC-8M, Date Unknown, 2 pages.

Honeywell, "Honeywell Sensing and Control, Sensors for Test and Measurement, Ways to Measure the Force Acting on a Rotating Shaft," https://measurementsensors.honeywell.com/techresources/appnotes/Pages/Ways_to_Measure_the_Force_Acting_on_a_Rotating_Shaft.aspx, Copyright 2004-2020, 3 pages.

Wikipedia, "Belleville washer," https://en.wikipedia.org/wiki/Belleville_washer, last edited on Jan. 6, 2020, 6 pages.

Wikipedia, "Harmonic drive," https://en.wikipedia.org/wiki/Harmonic_drive, last edited on Feb. 9, 2019, 4 pages.

Wiki How, "How to Determine Gear Ratio," https://www.wikihow.com/Determine-Gear-Ratio, Oct. 16, 2019, 5 pages.

Wikipedia, "Strain wave gearing," https://en.wikipedia.org/wiki/Strain_wave_gearing, last edited on Dec. 10, 2019, 2 pages.

Harmonic Drive, "Speed Reducers for Precision Motion Control," 2018, 56 pages total.

Wikipedia, "Cycloidal drive," https://en.wikipedia.org/wiki/Cycloidal_drive, last edited on Feb. 10, 2020, 3 pages.

Ato, "Planetary Speed Reducer Working Principle and Applications," Jan. 2, 2020, 5 pages.

International Searching Authority, "Notification of Transmittal of the International Search Report and the Written Opinion of the International Searching Authority," dated Jun. 23, 2020, in International application No. PCT/US2020/019032.

Wikipedia, "Bearing (mechanical)", retrieved from https://en.wikipedia.org/wiki/Bearing_(mechanical) on Aug. 31, 2021.

Handbook of Compliant Mechanims, "Elements of Mechanisms", First Edition, Chapter 11, pp. 155-185, 2013.

Wikipedia, "Compliant mechanism", retrieved from https://en.wikipedia.org/wiki/Compliant mechanism on Aug. 31, 2021.

Handbook of Compliant Mechanims, Howell, "Introduction to Compliant Mechanisms", First Edition, Chapter 1, 2013.

Wikipedia, "Rectilinear polygon", retrieved from https://en.wikipedia.org/wiki/Rectilinear_polygon on Aug. 31, 2021.

Torque Measurement, "How to measure torque?", retrieved from https://www.futek.com/torque-measurement on Jul. 6, 2021.

\* cited by examiner

FIG. 1B  SECTION A-A

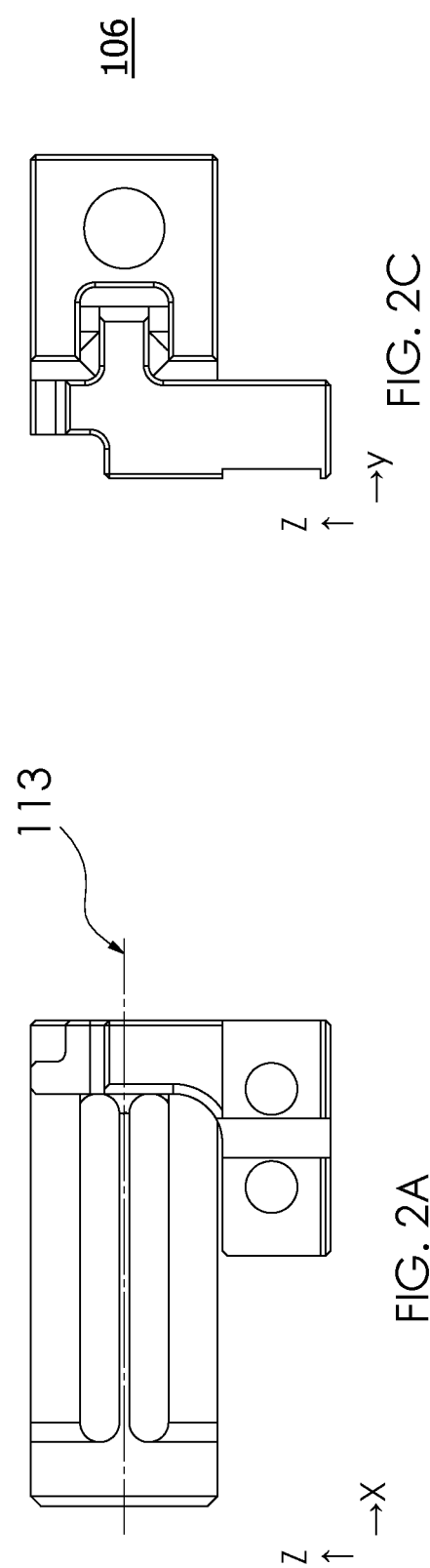
FIG. 2A
FIG. 2B
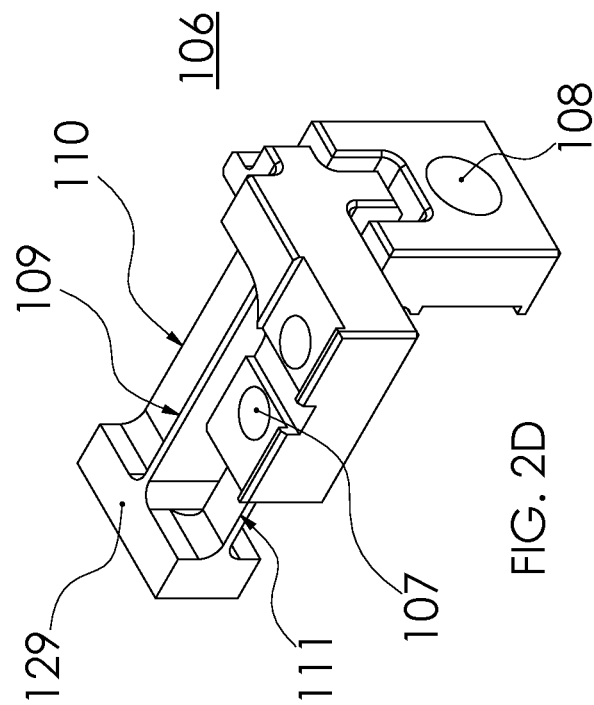
FIG. 2C
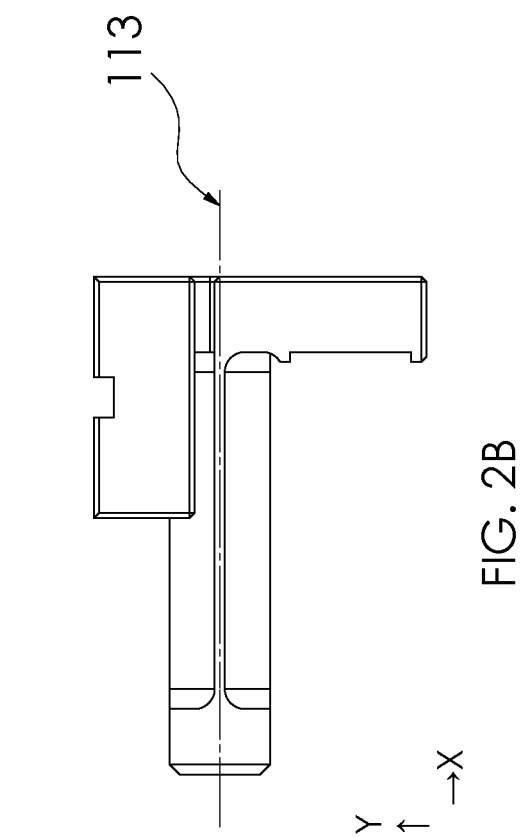
FIG. 2D

COMPLIANT MECHANISM FOR IMPROVING AXIAL LOAD SENSING IN ROBOTIC ACTUATORS

CROSS-REFERENCE TO RELATED APPLICATION

This application claims priority to U.S. Provisional Patent Application No. 63/250,281 filed on Sep. 30, 2021 and entitled "Compliant Mechanism for Improving Axial Load Sensing in Robotic Actuators", the content of which is hereby incorporated by reference.

TECHNICAL FIELD

Embodiments of the invention are in the field of compliant mechanisms in robotic actuators.

BACKGROUND

As addressed in U.S. Pat. No. 10,463,560, exoskeletons are mechatronic systems worn by a person in such a way that a direct transfer of mechanical power from the exoskeleton occurs. These robotic mechanisms have been applied in a variety of settings such as, for example, telemanipulation, man-amplification, rehabilitation, and to assist impaired human motor control. However, many of these applications of exoskeleton devices have yet to find widespread use, acceptance, or practicality.

One example area in which these devices have been proposed is the treatment of stroke. Stroke affects thousands of Americans every year and the recovery process is long, difficult, and costly. The use of a robotic exoskeleton may potentially reduce the length, difficulty, and cost of this recovery process. Various efforts have been proposed to provide a robotic exoskeleton for the upper-body.

Such exoskeletons and mechatronic systems may include actuators. Load sensors may be used to detect forces being exerted by robotic actuators. For example, an upper body exoskeleton may use one or more sensors to evaluate the amount of force exerted by a linkage (e.g., a robotic forearm) on a joint (e.g., an elbow). Further, it is often useful for the robotic actuator to know how much force the robotic actuator is imparting on an object. Typical robotic actuators only consider the position of the actuator and can thus inadvertently exert large forces on an object when the actuator moves. Torque sensing actuators (or sensing actuators in general) allow the actuator to consider the force of the interaction in addition to the position and thus help prevent accidents when the actuator moves. In addition, the force sensor can provide feedback to the operator and allow for additional data to be collected.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements.

FIG. 1B provides a cross-sectional view of the joint.

FIGS. 2A, 2B, 2C, and 2D respectively illustrate top, front, side, and perspective views of a bracket in an embodiment.

DETAILED DESCRIPTION

Figure 1A:
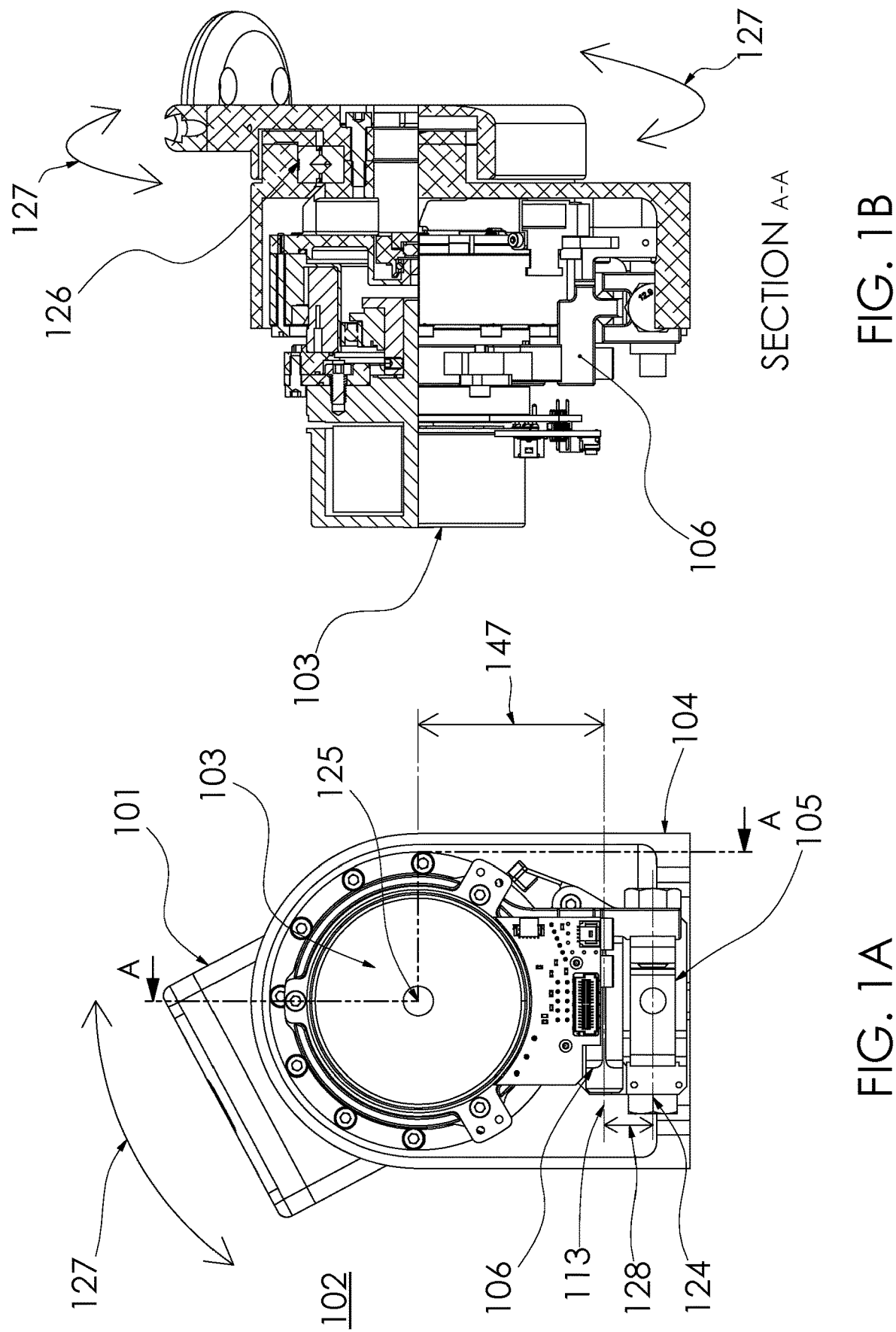
FIG. 1A provides a side view of a joint in an embodiment.
Figure 1C:
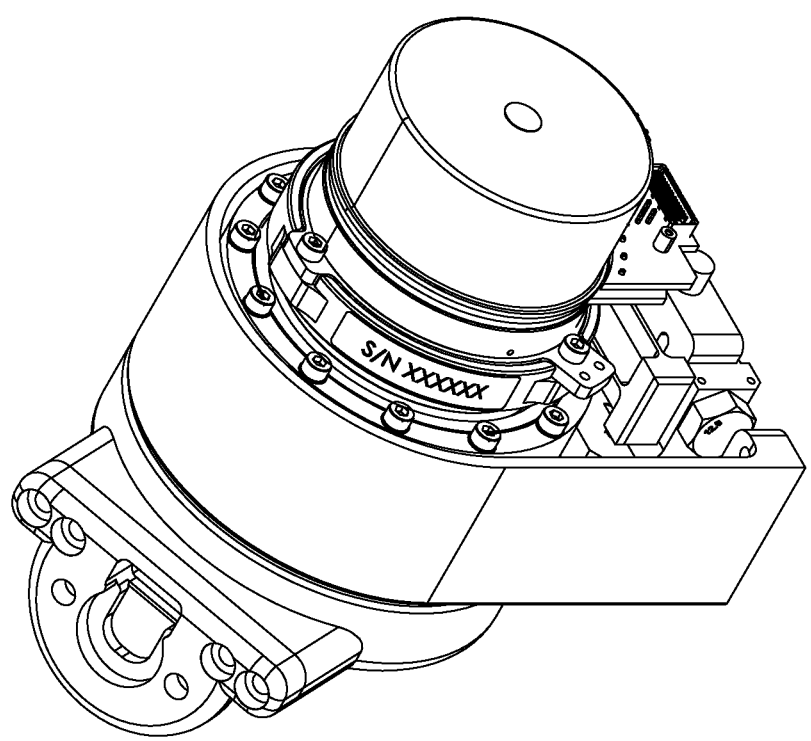
FIG. 1C provides a perspective view of the joint.
Figure 3A:
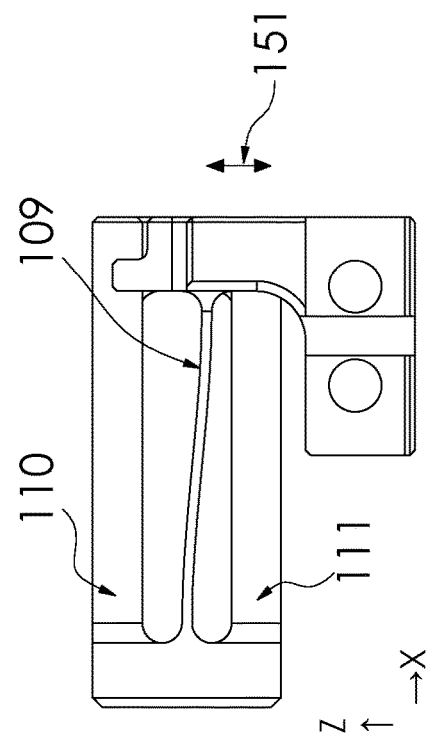
FIGS. 3A and 3B illustrate how an embodiment of a bracket has compliance in or along the Y translational axis.
Figure 4A:
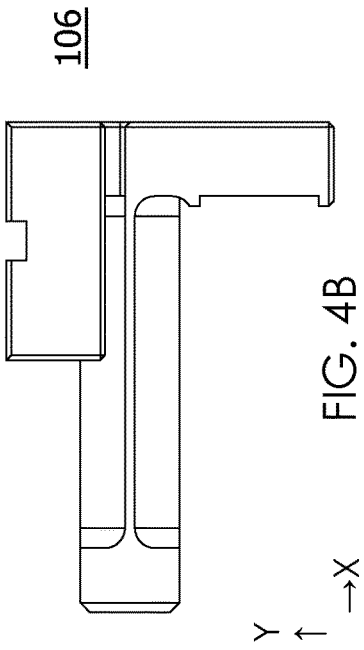
FIGS. 4A and 4B illustrate how the embodiment of FIGS. 3A and 3B has compliance in or along the Z translational axis.
Figure 3B:
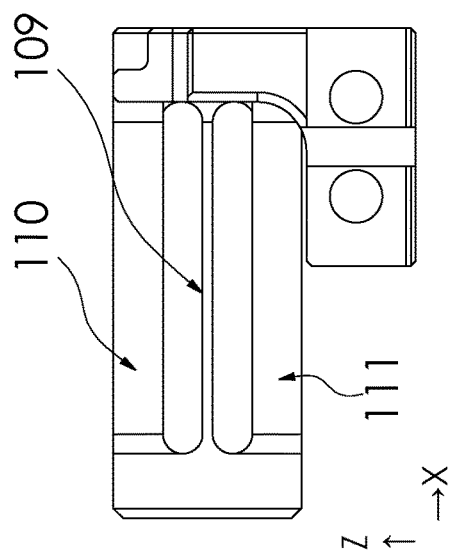
Figure 4B:
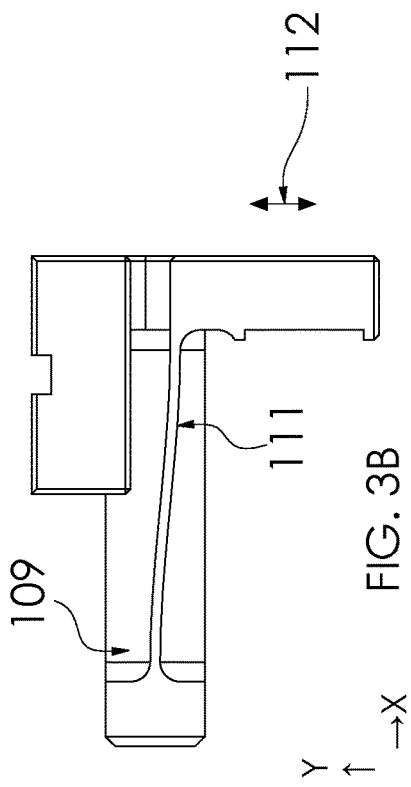
Figure 5A:
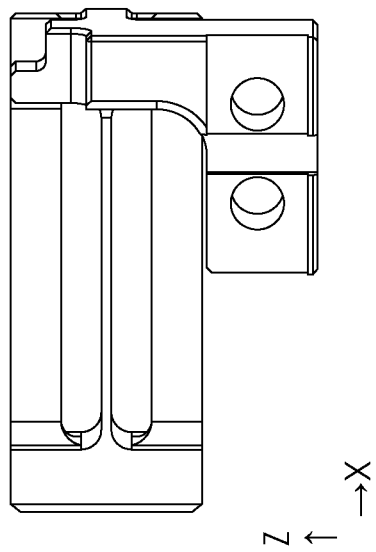
FIGS. 5A and 5B illustrate how the embodiment of FIGS. 3A and 3B has compliance about the XZ rotational axis.
Figure 5B:
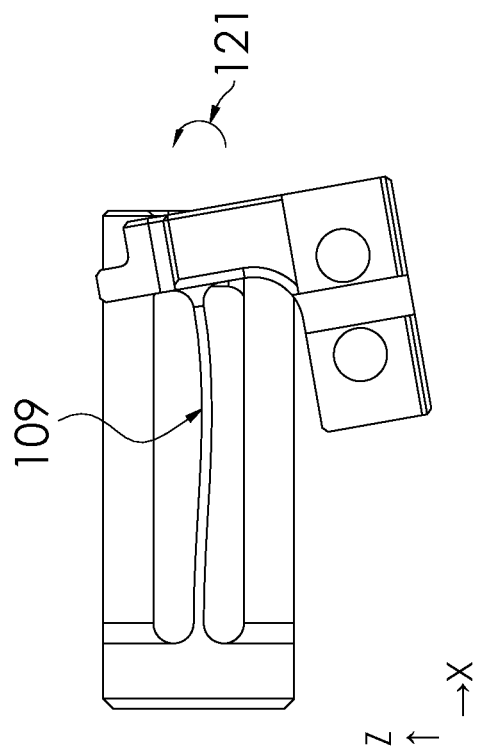
Figure 6A:
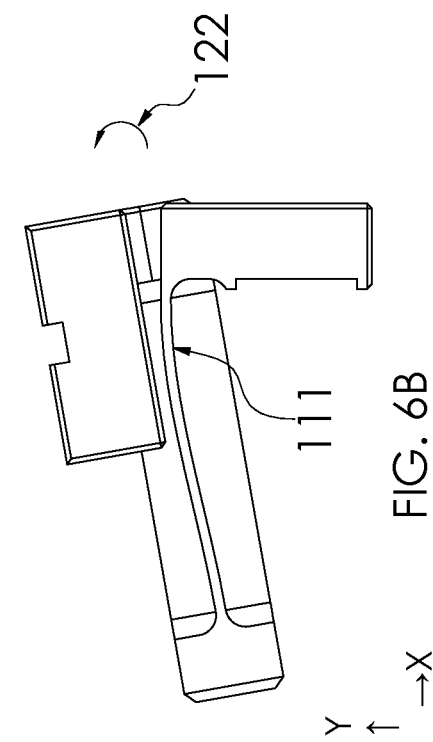
FIGS. 6A and 6B illustrate how the embodiment of FIGS. 3A and 3B has compliance about the XY rotational axis.
Figure 6B:
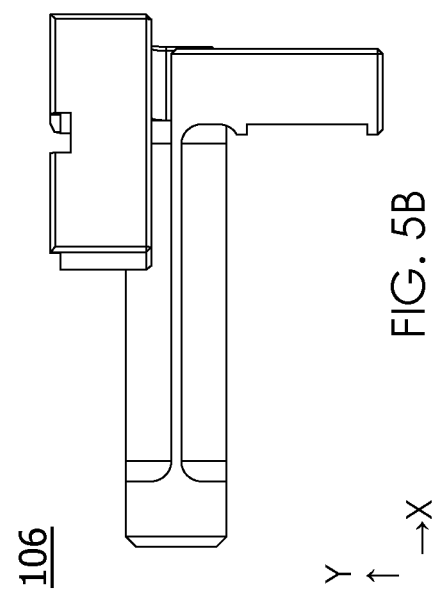
Figure 7C:
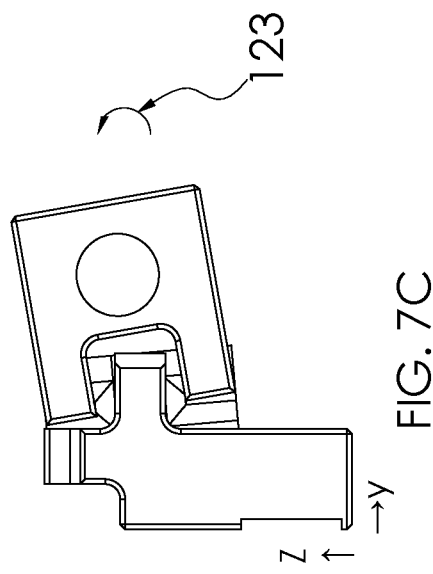
FIGS. 7A, 7B, 7C illustrate how the embodiment of FIGS. 3A and 3B has compliance about the YZ rotational axis.
Figure 7A:
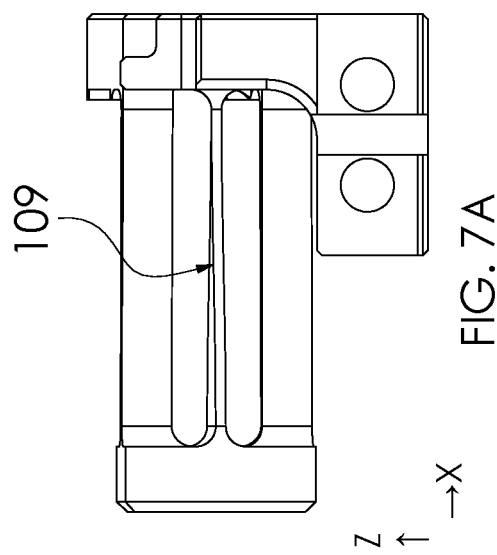
Figure 7B:
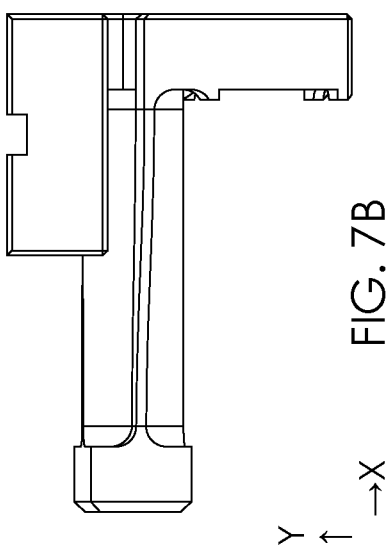

Reference will now be made to the drawings wherein like structures may be provided with like suffix reference designations. In order to show the structures of various embodiments more clearly, the drawings included herein are diagrammatic representations of structures. Thus, the actual appearance of the fabricated structures, for example in a photo, may appear different while still incorporating the claimed structures of the illustrated embodiments (e.g., walls may not be exactly orthogonal to one another in actual fabricated devices). Moreover, the drawings may only show the structures useful to understand the illustrated embodiments. Additional structures known in the art may not have been included to maintain the clarity of the drawings. For example, not every layer of a device is necessarily shown. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Phrases such as "comprising at least one of A or B" include situations with A, B, or A and B.

Applicant determined integrating a load sensor into a robotic actuator such that it is not affected by loads not aligned with its load sensing axis (which can lead to inaccurate measurements of the desired load) is a difficult task when designing robotic force sensing actuator systems. Applicant determined many conventional designs do not attempt to isolate load sensors and accept that there will be greater load sensing inaccuracy due to, for example, loads not aligned with the desired axis to be measured. For instance, robotic actuators are frequently mounted directly to reaction torque load cells, and the reaction torque load cells are fixed to the overall robotic structure. This arrangement passes all forces and moments (aligned as well as un-aligned to desired axis or axes to be sensed) applied to the robotic actuator through the reaction torque load sensor. As another example, in many applications that use strain gages to sense loads, a Wheatstone bridge arrangement of the strain gage elements theoretically eliminates the effect of nonaligned loads on the sensing output. However, due to imperfections in manufacturing of these sensors, error is often introduced by these loads on the sensor output.

Applicant determined that other designs may attempt to isolate loads on the load sensing element by supporting the system with a support system which (a) restricts the movement of the actuator in directions not aligned with the output movement direction of the robotic actuator and (b) supports any loads which act in directions not aligned with the output force or moment of the actuator. Such attempts are an improvement over some conventional systems but are still imperfect. For instance, Applicant determined in such designs the support system of the actuator did not perfectly support all non-aligned forces on the actuator. As a result, some non-aligned forces were still acting on the load sensor. Also, the support itself was imperfect and introduced additional forces (not related to friction in the support system) which acted on the load sensor and thereby introduced error.

However, embodiments described herein are improvements over the above-mentioned systems because, in addition to the support system which mostly eliminates any loads not aligned to the output force of the actuator but which can introduce its own error, a compliant element prevents nearly all misaligned loads thereby reducing the effect of any imperfections which may exist in the support system on the load sensor.

An embodiment addresses the undesirable sensing of forces that may be the result of securing the sensor to the system (e.g., a joint). Angular misalignment (e.g., between axis 124 of sensor 105 and axis 113) is allowed for by using an arrangement of compliant arms compliant to misalignment but stiff to other displacements. At least some of the arms are connected in series to each other. When angular misalignment of the sensor relative to the housing occurs, one or more compliant arms deform to accommodate the misalignment.

Applicant modeled a support system (e.g., bearing 126) and compliant element (e.g., bracket 106) as two springs in parallel. The support system (spring #1) is analogous to a spring which is highly stiff in all directions not aligned with the output movement or force direction (127) of the actuator (see bearing 126 about which linkage 101 rotates) and has low stiffness in the aligned direction. The compliant element (e.g., element 106) (spring #2) can be analyzed as an element which is only stiff in the output direction of the actuator. For example, force direction 127 (non-stiff) (or at least an element thereof) and axis 124 (stiff) are parallel to each other. In other words, moments in or related to direction 127 are not resisted by bearing 126 but are supported by acting through distance 147 on the rigid axis 113 of the flexure 106. During loading both springs compress the same distance because they are both connected to the robotic actuator, which can be assumed to be rigid. For loads not aligned to the output movement or force of the actuator, the comparatively stiffer support system (spring #1) carries a much greater fraction of the load than the compliant element (spring #2). Because the load sensor is attached to the compliant element, very little of the non-aligned load is transmitted to the sensor. Forces which are aligned with the output movement or force of the actuator are mostly supported by the compliant element because in this direction the stiffness of the compliant element is much greater than the support system, and so the compliant element takes a much greater fraction of the load, which is then applied to the load sensor for measurement.

An embodiment allows for the use of linear tension compression load cells to measure reaction torque of robotic actuators in some configurations. Due to the ability of the compliant element to effectively only or largely transmit aligned forces to the load cell, an embodiment attaches a linear load cell and a compliant element arranged such that the non-compliant axis of the compliant element (124) is not parallel to an axis of rotation (125) and has some distance between the non-compliant axis and the axis of rotation. The robotic actuator is supported as described previously, such that it is allowed to rotate about the previously mentioned axis of rotation (125), which is aligned with its output force or movement. Thus, when a torque is applied and is aligned with the output rotation of the actuator, the force passes through the support system and is supported by a tension compression load acting through the rigid direction axis (113) of flexure (106) at a distance (147) from the pivot 125). Due to the mounting of the flexure (106) to the load cell (105), this tension compression load acting through (113) is sensed and the torque is measured.

An embodiment couples a robotic actuator to an axial load sensor through a compliant element (which has flexibility in three rotational axes and two translational axes) in an arrangement such that the one non-compliant translational axis of the compliant element is aligned (but not necessarily colinear) with the sensing axis of the load sensing element. For example, they may be aligned within +/−2 degrees of parallel with each other. This improves load sensing accuracy. In an embodiment the robotic actuator is also be constrained by a support system (e.g., bearing 126) which restricts the movement of the actuator in directions not aligned with the output movement direction of the robotic actuator and supports any loads which act in directions not aligned with the output force or torque of the actuator. This load sensing accuracy improvement is achieved because the compliant element (e.g., bracket 106), in combination with the support system (e.g., bearing 126), significantly reduces certain loads from the system (e.g., loads acting in directions not aligned with the sensing axis of the load sensor) from being passed through to the load sensor. These non-aligned loads can cause erroneous load readings or greater uncertainty in a measured load value.

Although many arrangements of the non-compliant axis (e.g., axis 113) of the compliant element to the load sensing axis (e.g., axis 124) of the load sensor may function satisfactorily, an embodiment optimizes the load sensing accuracy of the system by arranging the non-compliant axis of the compliant element to be colinear to the sensing axis. This arrangement eliminates or strongly reduces any forces or moments which may be created due to the linear distance (e.g., distance 128) between the non-compliant axis and the sensing axis from acting on the force sensor, or any misalignment of forces acting from the compliant element to the load sensor.

Figure 8B:
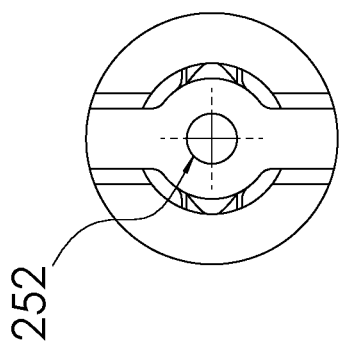
FIGS. 8A, 8B, and 8C respectively illustrate perspective, top, and bottom views of an inline compliant element in an embodiment.
Figure 8C:
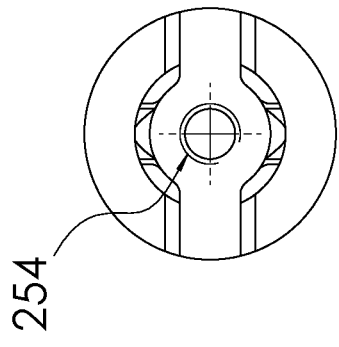
Figure 8A:
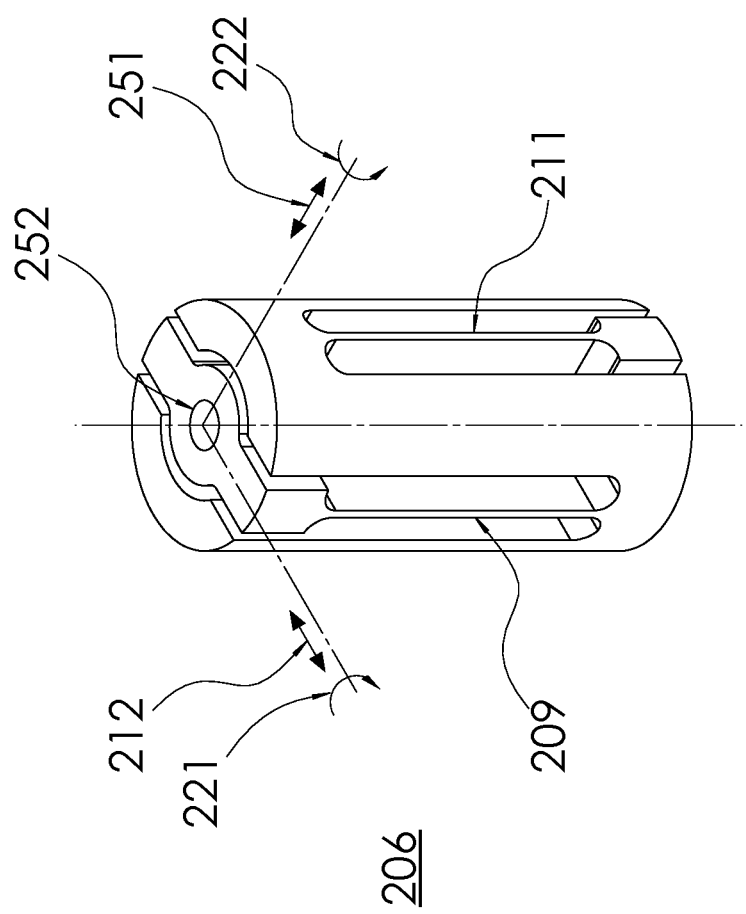
Figure 9:
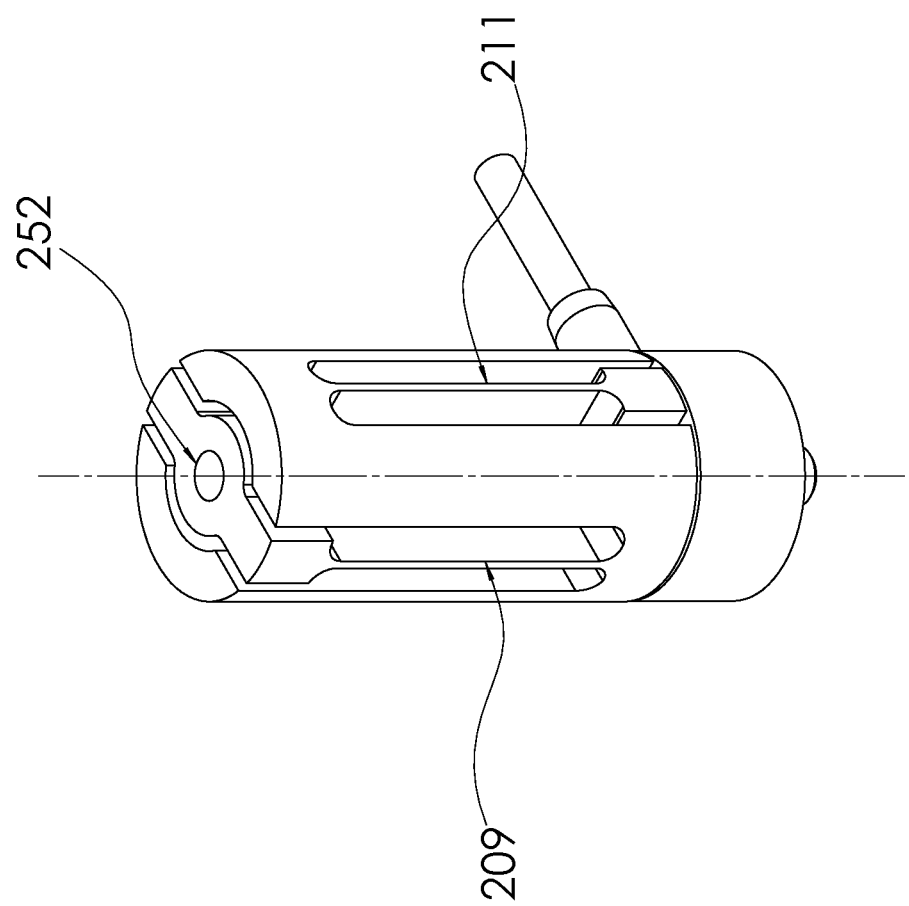
FIG. 9 illustrates an assembly of the compliant element of FIG. 8A with the sensor of FIG. 8D.
Figure 8D:
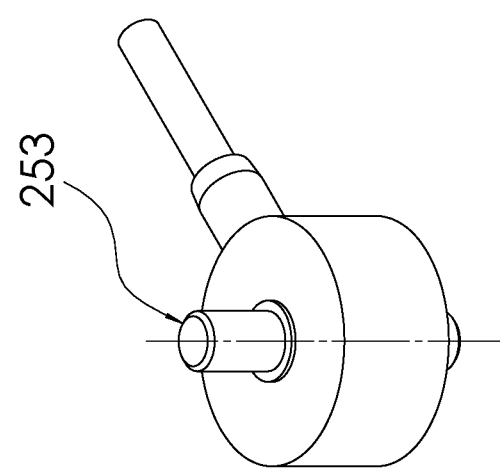
FIG. 8D illustrates a perspective view of a linear tension compression load cell.

FIGS. 8A, 8B, and 8C respectively illustrate perspective, top, and bottom views of an inline compliant element in an embodiment. FIG. 8D illustrates a perspective view of a linear tension compression load cell. FIG. 9 illustrates an assembly of the compliant element of FIG. 8A with the sensor of FIG. 8D. Arms 209, 211 are analogous to arms 109, 111. Directions/rotations 251, 212, 221, 222 are respectively analogous to directions/rotations 151, 112, 121, 122. Element 206 also is compliant in a rotation (not illustrated or labeled) analogous to rotation 123. Element 206 includes void 252 for coupling to a support system (e.g., bearing 126) and sensor projection 253 couples to void 254 near the bottom of compliant element 206.

As addressed in The Handbook of Compliant Mechanisms, First Edition, 2013, and regarding "compliant element" as that term is used herein, if something bends to do what it is meant to do, then it is compliant. If the flexibility that allows it to bend also helps it to accomplish something useful, then it is a compliant mechanism. Traditionally stiff or rigid parts are connected with stiff or rigid hinges (like a door on its hinge or a wheel on an axle) or sliding joints. However, compliant elements are not restricted to rigid parts connected with rigid joints. Instead, such compliant element systems (e.g., natural elements) are flexible instead of stiff, and allow motion from bending flexible parts. Such systems use flexibility to achieve movement. Thus, within mechanical engineering and similar disciplines, a compliant mechanism is a flexible mechanism that achieves desired force and motion transmission through elastic body deformation. It gains some or all of its motion from the relative flexibility of its members rather than from rigid-body joints alone. These compliant elements may be monolithic (single-piece) or jointless structures. Some common devices that use compliant mechanisms are backpack latches and paper clips.

A degree of freedom for a compliant element, as used herein, is a direction of translation or rotation in which the compliant element can bend.

Thus, embodiments address issues common in load sensing applications. To achieve high accuracy, embodiments of force sensing systems couple the system to be measured to a load cell in a way that allows for compliance in directions that are not in line with the load sensor's sensing axis. In contrast, to introduce this compliance conventional load sensors are integrated with ball joints or other elements utilizing rolling or sliding to create compliance in directions which are not aligned with the load sensing axis. These rolling or sliding elements have inherent disadvantages such as a limited rolling or sliding life, friction (which may transmit misaligned forces and thus possibly cause error), or unwanted compliance in the load sensing axis (such as backlash in the case of reversing loads). The use of these elements also increases the overall size and weight of the robotic load sensing actuator because rolling or sliding elements are typically discrete components that require integration.

To address these disadvantages of rolling or sliding elements, embodiments use flexible compliant mechanisms to introduce compliance to a force sensing robotic actuator. Embodiments have long service life, very low resistance to motion, and little to zero backlash. As used herein, "backlash" concerns interplay between adjacent movable parts (e.g., a series of gears). Embodiments are also much more compact than a comparable rolling or sliding system, and have fewer components. In an embodiment, flexible elements (and the features which are required to integrate those flexible elements into the load sensing actuator) are achieved in just one component (e.g., bracket 106). The component requires little to no maintenance and will likely last longer than the robotic system it is applied in.

The load sensing error of an embodiment, such as bracket 106, is approximately ten times lower than that of some conventional designs.

Additionally, in the case of impacts which may mechanically overload the robotic system, an embodiment of the compliant element serves as a mechanical fuse and fails in a desirable way. For example, compliant element 106 will buckle when the robot is overloaded. Once buckling occurs, the compliant element becomes significantly more compliant in the non-compliant direction due to the change in shape of the beams. This reduction in stiffness reduces peak impact forces and absorbs impact energy. A buckled compliant element is still able to function, albeit to a reduced degree. The system overall can still function after an impact and is thus resilient to some abuse.

As noted above, a purpose of the flexible elements (e.g., arms 109, 110, 111) is to allow for compliance in directions not aligned with the load sensing axis. Thus, an embodiment uses a geometry with long, thin beams because this shape results in lower bending stresses in the material. Embodiments use one or more materials (e.g., alloys) with a low elastic modulus that reduces bending stresses that result from the expected misalignment.

The compliant elements support large loads and stresses that result from: (a) loads in the sensing axis, and (b) stresses from bending in the other directions. Thus, a material with a high yield strength and/or fatigue strength is used in embodiments so that the compliant element does not fail under high loads or repeated loading.

The flexible elements may be subject to compressive loads in some designs. If this is the case, embodiments provide that the geometry of the flexible elements have a buckling strength greater than the expected compressive load. Thus, in some embodiments the compliant elements are short and thick to support compressive loads. Using materials with a high elastic modulus will also increase buckling strength.

Because of the conflicting requirements of buckling strength and compliance when loads across the flexible element are in compression, embodiments strike a balance with an appropriate shape and elastic modulus that results in a compliant design that does not buckle. For example, after the elastic modulus was determined Applicant found a material with a yield strength or fatigue strength that suitable for certain applications. An embodiment uses titanium for more demanding applications where the compliant element is highly loaded and yet must be as compact as possible. However, Aluminum alloys are suitable in less demanding environments.

Given compression loading requirements of the compliant element, material stiffness needed to prevent buckling for a given shape of element can be determined. Because higher material stiffnesses result in a less compliant element, several embodiments utilize a compliant element with a material with just enough stiffness to not buckle under typical loads. This maximizes compliance while still meeting design criteria.

Embodiments are arranged together such that as a system the compliant element is capable of deflecting in five of six degrees of freedom.

An embodiment includes a one-piece construction (monolithic) of the compliant element, although other embodiments are not so limited. Multiple pieces may be arranged to form a non-monolithic compliant element in other embodiments. For example, pieces of the element may be coupled to each other via welding and the like.

Embodiments use symmetrical designs of flexible elements to keep the stresses experienced by the material evenly distributed, which results in an overall stronger design.

An embodiment is comprised of two flat beams (e.g., beams 109, 111) which are oriented perpendicular to each other and connected in series. Each beam has three compliant (two rotation and one translation) and three non-compliant directions (one rotation and two translation). The perpendicular orientation between the beams results in one non-compliant translational axis and one non-compliant rotational axis of each beam coinciding with a compliant translation and a compliant rotational axis of the other beam. By connecting these beams in series, the resulting part thus has five compliant directions and one non-compliant direction. To make the series arrangement of beams more compact, the beams are folded onto each other so they occupy the same length, and one of the beams is split along its width so that the other beam can be inserted inside it. Then mounting features are added to connect the ends of either beam to other components in the actuator assembly.

A perfect colinear alignment of the non-compliant axis of the compliant element and the load sensing axis of the load sensor is not required for the invention to function. For instance, if a compressive load aligned with the non-compliant axis of the compliant element is applied through the compliant element and there is a linear distance (128) between the axis of the load sensing element (124) and the non-compliant axis of the compliant element (113), a moment is created which acts on the load sensing element and is proportional to the distance between the two axes and the compressive load. Because this moment is proportional to the load which the system is intended to measure, any error that is generated by the moment will be consistent for any load. Thus, these errors created by misalignment of the axes can be accounted for by calibration or other methods and may not substantially affect the sensing system accuracy.

While most embodiments described herein increase the load sensing accuracy of a load sensor when it is integrated into a robotic actuator system, other embodiments can be applied to measure the reaction torque of a robotic actuator with a tension compression load cell because the invention can isolate the tension compression force from a torque load.

An embodiment includes a compliant mechanism that is compliant in three rotational and two translational degrees of freedom and non-compliant in one translational degree of freedom. The compliant mechanism (or sometimes referred to as a compliant element) is attached to a load sensor such that the axis of the one non-compliant degree of freedom is aligned (e.g., within +/−2 degrees of being parallel to each other) to the load sensing axis of the load sensor. The compliant mechanism is also attached to a system to be measured whereby the system is supported in such a way that loads which are to be measured by the load sensor are unconstrained.

Embodiments provide advantages over conventional systems. Such systems include systems that are compliant in five degrees of freedom where the one noncompliant degree of freedom is twisting about the load sensing axis. This twisting is not compatible with the tension compression sensing of load sensing element used in various embodiments described herein. As a result, measurement accuracy is decreased and/or more complicated non-axial sensors must be used. Such systems may also be compliant parallel to the load sensing axis because they include springs that are aligned to the axis of the load sensor. Tension and compression loads acting on the load sensor cause the springs to compress or extend.

Further, many conventional systems isolate a load sensor from extraneous forces by using sliding or rolling bearings to prevent extraneous forces. These designs have disadvantages as outlined previously.

Other methods may use compliant elements with a non-compliant axis that is not aligned with the load sensing axis. Extraneous loads can be transferred through this non-compliant axis to the load sensing element and introduce sensing errors, which is in contrast to embodiments described herein.

Conventional systems in the field of load sensing robotic actuators tend to use force sensors at the end effector of the robot to detect the interaction force between the robot and what the robot interacts with. This implementation of force sensing is incapable or less capable of detecting unexpected impacts on the body of the robot, where no force sensor exists. For example, consider a robotic arm with only an end effector load sensor. During a movement of the robotic arm, if an object (for instance a person) is impacted by any part of the robot other than the end effector, the robot will have no way to detect this impact or know to stop moving because forces at the location of impact are not sensed. The end result is that after impact, the robot will continue to apply force and try to accomplish its desired movement. Because robotic arms can be quite strong, objects can be severely damaged by the robot without the robot's knowledge. However, embodiments described herein instead include a sensor in, for example, a joint that is not located at the end effector of the robot. Thus, embodiments are more ideal in applications where, for example, robots and people interact.

Other conventional solutions for force measuring at the joint level typically use reaction torque load cells, which are rigidly mounted or mounted with sliding or rolling bearings to prevent extraneous loads from being applied to the load cell. Such dynamic mounts fail overtime, are more expensive or burdensome to maintain (e.g., in a dirty or rust-prone environment such as an industrial manufacturing facility), and are less accurate that statically mounted sensors described herein.

In an embodiment the measurement direction of said load cell is parallel to an axis (e.g., Z axis) and located at the center of said load cell (e.g., axis 124). The measurement axis of the load cell is parallel to the non-compliant axis (e.g., 113) of the compliant element. The load cell is attached to the bracket base of the compliant element. When unbalanced moment loads exist within or are applied to the system to be measured, the moment loads are transferred through the compliant element and converted into tension compression forces to be measured by the load cell. Because of the compliance of the compliant element, no other loads (or at least reduced loads) applied to or internal to the system will be measured by the load cell An embodiment includes the use of a compliant mechanical element to isolate moment loads from a system and apply the moment loads to a tension compression load cell such that the measurement output of the tension compression load cell is related (mostly) to only the moment loads applied to the system. The compliant mechanical element includes a base and a platform such that relative to the base, the platform can rotate in three axes and translate in two axes while being rigid in one translation axis.

An embodiment of the system is comprised of: (a) a physical system with moment loads to be measured, (b) a compliant mechanical element that comprises a base and platform (wherein the platform, relative to the base, is free to translate in two axes and rotate in three axes), and (c) a bearing attached to the physical system and oriented such that the rotation axis of the bearing is perpendicular and non-intersecting to the non-compliant translational degree of freedom of the compliant mechanical element. Further, the system includes a tension compression load cell attached to the compliant mechanical element such that the measurement direction of the load cell is generally or substantially parallel (+/−2 degrees) to the non-compliant translational degree of freedom of said compliant mechanical element.

The following examples pertain to further embodiments.

Example 1. An exoskeleton robotic system comprising: a first linkage (101) and a second linkage; a bearing (126) coupled to the first linkage; a joint (102) coupling the first linkage to the second linkage, the joint including a motor (103) configured to rotate the first linkage about the bearing; an axial load sensor (105) configured to sense an axial force transmitted to the axial load sensor via the joint in response to the motor rotating the first linkage, the axial force including one of tension or compression but not torque; and a bracket (106) including first (107) and second (108) bracket locations and first (109), second (110), and third (111) arms; a housing (104) that includes at least part of the joint and which couples the bracket to the bearing; wherein (a) the bracket couples to the housing at the first bracket location and couples to the axial load sensor at the second bracket location; (b) the first arm couples both of the second and third arms to the first bracket location, and (c) the each of the second and third arms couple the first arm to the second bracket location.

Some conventional systems may include a system with a torque sensor, a compliant element with a single rigid axis aligned with the sensor, and a compliant element with only one non-compliant direction which is aligned with the sensor. These are arranged such that the two compliant elements act on the load in parallel, and the compliant element with one rigid direction is attached to the load sensor. In contrast, an embodiment generates rotation between two compliant elements with a motor. Instead of a compliant element with one non-compliant direction only, the embodiment uses a bearing with one non-compliant direction. Further, instead of a torque sensor the embodiment uses a linear force sensor. Also, the embodiment is compliant in different degrees of freedom than that of the conventional system.

Another version of Example 1: An exoskeleton robotic system comprising: a first linkage (101); a bearing (126) coupled to the first linkage; a joint (102) including a motor (103) configured to rotate the first linkage about the bearing; an axial load sensor (105) configured to sense an axial force transmitted to the axial load sensor via the joint in response to the motor rotating the first linkage, the axial force including one of tension or compression but not torque; and a bracket (106) including first (107) and second (108) bracket locations and first (109) and second (110) arms; a housing (104) that includes at least part of the joint and which couples the bracket to the bearing; wherein (a) the bracket couples to the housing at the first bracket location and couples to the axial load sensor at the second bracket location; (b) the first arm couples the second arm to the first bracket location, and (c) the second arm couples the first arm to the second bracket location.

Thus, not all embodiments require a bracket with three arms.

Another version of Example 1: An exoskeleton robotic system comprising: a first linkage (101); a bearing (126) coupled to the first linkage; a joint (102) including a motor (103) configured to move the first linkage along the bearing; an axial load sensor (105) configured to sense an axial force transmitted to the axial load sensor via the joint in response to the motor moving the first linkage along the bearing, the axial force including one of tension or compression but not torque; and a bracket (106) including first (107) and second (108) bracket locations and first (109) and second (110); a housing (104) that includes at least part of the joint and which couples the bracket to the bearing; wherein (a) the bracket couples to the housing at the first bracket location and couples to the axial load sensor at the second bracket location; (b) the first arm couples the second arm to the first bracket location, and (c) the second arm couples the first arm to the second bracket location.

A bearing, as used herein, is a machine element that constrains relative motion to only the desired motion, and reduces friction between moving parts. The design of the bearing may, for example, provide for free linear movement of the moving part or for free rotation around a fixed axis; or, it may prevent a motion by controlling the vectors of normal forces that bear on the moving parts. Most bearings facilitate the desired motion by minimizing friction. Bearings are classified broadly according to the type of operation, the motions allowed, or to the directions of the loads (forces) applied to the parts. Embodiments are not limited using bearings or to any one type of bearing.

Example 2. The robotic system of example 1, wherein: the first arm is a first compliant mechanism that is more compliant in a first direction (151) than a second direction (112); the second arm is a second compliant mechanism that is more compliant in the second direction than the first direction; the third arm is a third compliant mechanism that is more compliant in the second direction than the first direction; and the first direction is orthogonal to the second direction.

Example 3. The robotic system of example 1, wherein: the first arm is more compliant in a first direction (151) than a second direction (112); the second arm is more compliant in the second direction than the first direction; the third arm is more compliant in the second direction than the first direction; and the first direction is orthogonal to the second direction.

Example 4. The robotic system of example 1, wherein the bracket is a compliant mechanism having compliance about three rotational axes (axis related to rotation 121, axis related to rotation 122, axis related to rotation 123) and along two translational axes (151, 112) but not a third translational axis (113).

Example 5. The robotic system according to any of examples 1-4, wherein: the axial load sensor is configured to sense the axial force transmitted along an axial sensing axis (124); the axial sensing axis is parallel to the third translational axis 113).

Example 6. The robotic system of example 4, wherein the axial sensing axis is colinear with the third translational axis.

Example 7. The robotic system according to any of examples 4-6, wherein: the motor is configured to rotate the first linkage about a rotation axis (125); and the axial sensing axis does not intersect the rotation axis.

As a result, the axial load sensor may be used to determine torque loads.

Example 8. The robotic system of example 7, wherein: the axial load sensor senses reaction torque of rotation of the first linkage in response to the axial sensing axis not intersecting the rotation axis.

Example 9. The robotic system according to any of examples 1-8, wherein: the axial load sensor is not a torque load cell; and the axial load sensor is not coupled to a Wheatstone bridge and does not include a Wheatstone bridge.

Example 10. The robotic system according to any of examples 1-9, wherein the bracket is monolithic.

Example 11. The robotic system according to any of examples 1-10, wherein the bracket is statically coupled to the axial load sensor and is statically coupled to the housing.

Example 12. The robotic system according to any of examples 1-11, wherein the bracket is not slidingly coupled to the housing.

Example 13. The robotic system according to any of examples 1-12, wherein: the first arm is configured to be in tension when the second arm is in compression; and the first arm is configured to be in compression when the second arm is in tension.

Another version of Example 13. The robotic system according to any of examples 1-12, wherein: the first arm is configured to be in tension when the second and third arms are both in compression; and the first arm is configured to be in compression when the second and third arms are both in tension.

As a result, in an embodiment the bracket (e.g., any of arms 109, 110, 111) serves as a fuse and buckles (instead of fracturing) when the first linkage is overtaxed and the system fails. The bracket will buckle and fail in a safe manner. Bracket elements 107, 108, and 129 are overdesigned and unlikely to fail. Because of the arrangement of the arms in the embodiment of FIG. 2A, axial loads (tension and compression) cause either arm 109 to be in tension and arms 110 and 111 in compression, or arm 109 to be in compression and 110 and 111 to be in tension. Because the buckling strength of arm 109 is lower than the tensile strength of 110 and 111, and the buckling strength of arms 110 and 111 is lower than the tensile strength of 109, during overloading whichever beams are in compression will buckle before the other beams fail in tension. Due to the nature of a buckling failure, the flexible elements will bend out of shape while still supporting the load. Unless the buckling is severe, the flexible elements will still be in one piece and capable of supporting some load in both directions. The alternative to buckling is fracturing when an overload is applied. In this case the flexible elements will be broken into multiple pieces and will no longer be able to support bidirectional load.

Example 14. The robotic system according to any of examples 1-13, wherein: the first arm has first and second faces that are planar and which oppose each other; the first and second faces of the first arm are generally rectilinear in shape; the second arm has first and second faces that are planar and which oppose each other; the first and second faces of the second arm are generally rectilinear in shape.

Thus, "generally rectilinear" in shape would include a rectilinear polygon, which is a polygon all of whose edge intersections are at right angles. This would include a rectangular shaped arm such as the arms of FIG. 2D. A "generally rectilinear" shape accounts for manufacturing imperfections wherein a junction point between the arm and, for example, platform 129 maybe somewhat rounded but 95% or more of the planar surface of the arm is rectilinear. Such a shape is beneficial to provide the desired levels of flexibility versus stiffness needed for the arm or arms.

Example 15. The robotic system of example 14, wherein: the first and second faces of the first arm are parallel to each other; the first and second faces of the second arm are parallel to each other; the first face of the first arm is orthogonal to the first face of the second arm.

Example 16. The robotic system according to any of examples 1-15, wherein: the first arm includes at least one of titanium, aluminum, or combinations thereof; the second arm includes at least one of titanium, aluminum, or combinations thereof.

Example 1a. An exoskeleton robotic system comprising a linkage (1101); a first bracket (1106) and a second bracket (1107); a base (1126) that couples the first bracket to the linkage; a motor (1103) configured to linearly actuate the linkage along a first axis; an axial load sensor (1105) that couples the first bracket to the second bracket, wherein: (a) the axial load sensor is configured to sense an axial force transmitted to the axial load sensor via the linkage in response to the motor actuating the linkage, and (b) the axial force includes one of tension or compression but not torque; a housing (1104); wherein (a) the first bracket couples to the base at a first location of the first bracket and the first bracket couples to the axial load sensor at a second location of the first bracket; and (b) the second bracket couples to the axial load sensor at a first location of the second bracket and the second bracket couples to the housing at a second location of the second bracket; wherein (a) the housing has a flexibility parallel to the first axis that is greater than the housing's flexibility that is parallel to a second axis, the second axis being orthogonal to the first axis, (b) the first bracket has a flexibility parallel to the second axis that is greater than the first bracket's flexibility that is parallel to the first axis, and (c) the second bracket has a flexibility parallel to a third axis that is greater than the second bracket's flexibility that is parallel to the first axis, the third axis being orthogonal to both the first and second axes.

Figure 10:
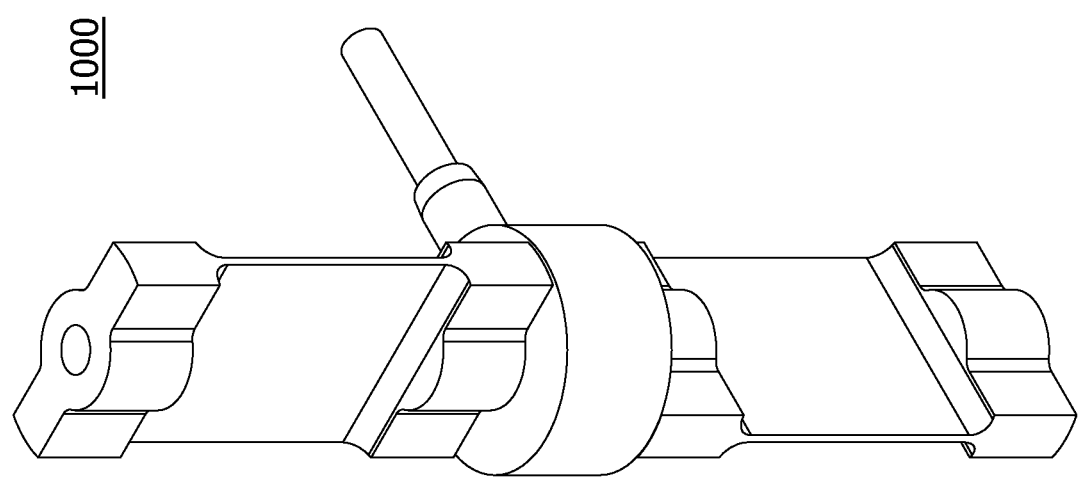
FIG. 10 provides a perspective view of a subcomponent of the joint of FIG. 11A.
Figure 11A:
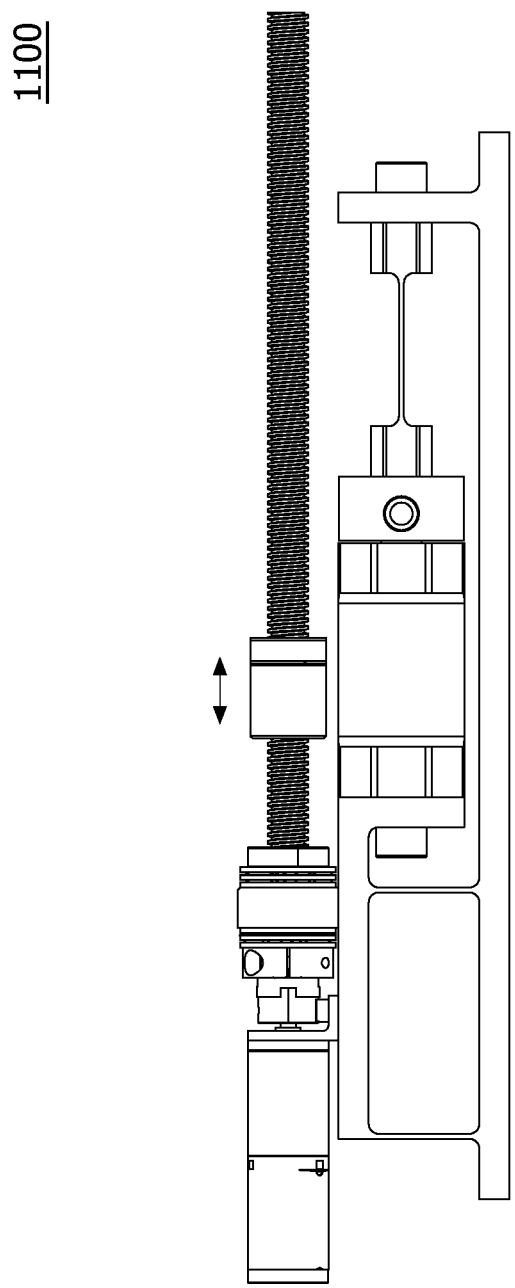
FIG. 11A provides a side view of a joint in an embodiment.
Figure 11B:
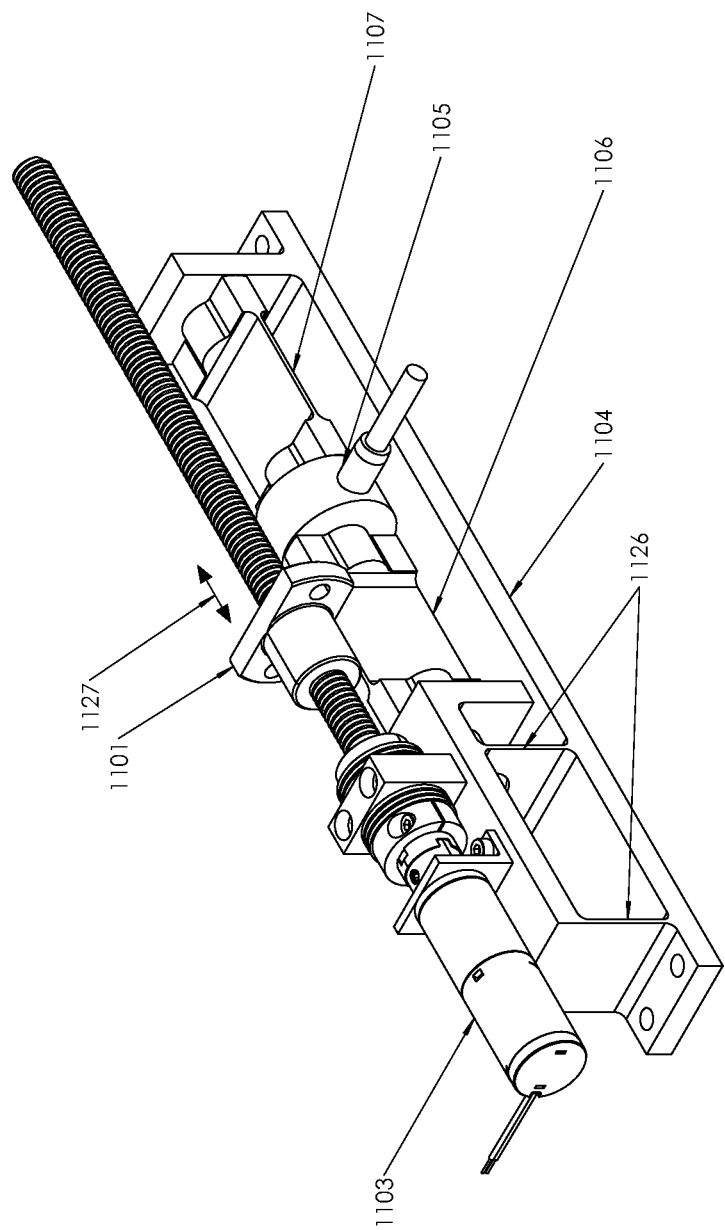
FIG. 11B provides a perspective view of the joint.

For example, see the linear actuator in FIGS. 10 and 11A-B. The linear actuator (mounted on housing 1104) moves output link 1101 linearly (motion 1127) along the threaded rod. The actuator is supported by flexure stage 1126, which is analogous to bearing 126 in FIG. 1B. Flexure stage 1126 (which may also be considered a base or bracket) restricts movement of motor 1103 in five of six degrees of freedom (except one translation degree which is parallel to the output motion). This last degree of freedom is restricted by the two-bracket inline flexure (see brackets 1106, 1107) with load cell 1105 attached between the two brackets. The one nonflexible degree of freedom of the two brackets and load cell corresponds to the one flexible degree of freedom of the flexure stage 126. Also, brackets 1106, 1107 are each flexible in five of six degrees of freedom which correspond to the nonflexible degrees of freedom of flexure stage 126.

Example 2a. The robotic system of example 1a, wherein: the housing is a compliant mechanism that is more compliant parallel to the first axis than the housing is compliant parallel to the second axis; the first bracket is a compliant mechanism that is more compliant parallel to the second axis than the first bracket is compliant parallel to the first axis; the second bracket is a compliant mechanism that is more compliant parallel to the third axis than the second bracket is compliant parallel to either of the first or second axes.

Example 3a. The robotic system of example 1a, wherein: the housing has greater compliance parallel to the first axis than parallel to the second axis; the first bracket has greater compliance parallel to the second axis than parallel to the first axis; the second bracket has greater compliance parallel to the third axis than parallel to either of the first or second axes.

Example 4a. The robotic system of example 1a, wherein: the housing is a compliant mechanism having compliance along a first translational axis but lacking compliance about three rotational axes and along a second and third translational axes; the first and second brackets are each compliant mechanisms and collectively have compliance along the second and third translational axes and the three rotational axes but not along the first translation axis.

Example 5a. The robotic system of example 4a, wherein: the axial load sensor is configured to sense the axial force transmitted along an axial sensing axis; the axial sensing axis is generally parallel to the first translational axis.

As used herein, "generally parallel" is within +/−5 degree of parallel.

Example 6a. The robotic system of example 5a, wherein the axial sensing axis is not colinear with the first translational axis.

Example 7a. The robotic system of example 5a, wherein the axial sensing axis does not intersect the first axis.

Example 7.5a The robotic system of example 5a, wherein: the axial sensing axis intersects the first and second brackets and the axial load sensor; the axial load sensor is between the first and second brackets.

Example 8a. The robotic system of example 1a, wherein the axial load sensor is not coupled to a Wheatstone bridge and does not include a Wheatstone bridge.

Example 8.1a The robotic system according to any of examples 1a-7.5a, wherein the axial load sensor is not coupled to a Wheatstone bridge and does not include a Wheatstone bridge.

Example 9a. The robotic system of example 1a, wherein the first and second brackets are not monolithic with each other.

Example 9.1a The robotic system according to any of examples 1a-8a, wherein the first and second brackets are not monolithic with each other.

Example 10a. The robotic system of example 1a, wherein the first and second brackets are each statically coupled to the axial load sensor and to the housing.

Example 10.1a The robotic system according to any of examples 1a-9a, wherein the first and second brackets are each statically coupled to the axial load sensor and to the housing.

Example 11a. The robotic system of example 1a, wherein neither of the first or second brackets is slidingly coupled to the housing.

Example 11a. The robotic system according to any of examples 1a-10a, wherein neither of the first or second brackets is slidingly coupled to the housing.

Example 12a. The robotic system of example 1a, wherein: the first bracket has first and second faces that are planar and which oppose each other; the first and second faces of the first arm are generally rectilinear in shape; the second bracket has first and second faces that are planar and which oppose each other; the first and second faces of the second arm are generally rectilinear in shape.

Example 12.1a The robotic system according to any of examples 1a-11a, wherein: the first bracket has first and second faces that are planar and which oppose each other; the first and second faces of the first arm are generally rectilinear in shape; the second bracket has first and second faces that are planar and which oppose each other; the first and second faces of the second arm are generally rectilinear in shape.

Example 13a. The robotic system of example 12a, wherein: the first and second faces of the first bracket are parallel to each other; the first and second faces of the second bracket are parallel to each other; the first face of the first bracket is orthogonal to the first face of the second bracket.

Example 14a. The robotic system of example 13a, wherein: the first bracket includes at least one of titanium, aluminum, or combinations thereof; the second bracket includes at least one of titanium, aluminum, or combinations thereof.

Example 14.1a The robotic system according to any of examples 1a-13a, wherein: the first bracket includes at least one of titanium, aluminum, or combinations thereof; the second bracket includes at least one of titanium, aluminum, or combinations thereof.

Example 1b. An exoskeleton robotic system comprising a linkage (1101); a first bracket (1106) and a second bracket (1107); a third bracket (1126) that couples the first bracket to the linkage; a motor (1103) configured to linearly actuate the linkage along a first axis; an axial load sensor (1105) that couples the first bracket to the second bracket, wherein: (a) the axial load sensor is configured to sense an axial force transmitted to the axial load sensor via the linkage in response to the motor actuating the linkage, and (b) the axial force includes one of tension or compression but not torque; a housing (1104); wherein (a) the first bracket couples to the third bracket at a first location of the first bracket and the first bracket couples to the axial load sensor at a second location of the first bracket; and (b) the second bracket couples to the axial load sensor at a first location of the second bracket and the second bracket couples to the housing at a second location of the second bracket; wherein (a) the housing has a flexibility parallel to the first axis that is greater than the housing's flexibility that is parallel to a second axis, the second axis being orthogonal to the first axis, (b) the first bracket has a flexibility parallel to the second axis that is greater than the first bracket's flexibility that is parallel to the first axis, and (c) the second bracket has a flexibility parallel to a third axis that is greater than the second bracket's flexibility that is parallel to the first axis, the third axis being orthogonal to both the first and second axes.

Example 2b. The robotic system of example 1b, wherein: the housing is a compliant mechanism that is more compliant parallel to the first axis than the housing is compliant parallel to the second axis; the first bracket is a compliant mechanism that is more compliant parallel to the second axis than the first bracket is compliant parallel to the first axis; the second bracket is a compliant mechanism that is more compliant parallel to the third axis than the second bracket is compliant parallel to either of the first or second axes.

Example 3b. The robotic system of example 1b, wherein: the housing has greater compliance parallel to the first axis than parallel to the second axis; the first bracket has greater compliance parallel to the second axis than parallel to the first axis; the second bracket has greater compliance parallel to the third axis than parallel to either of the first or second axes.

Example 4b. The robotic system of example 1b, wherein: the housing is a compliant mechanism having compliance along a first translational axis but lacking compliance about three rotational axes and along a second and third translational axes; the first and second brackets are each compliant mechanisms and collectively have compliance along the second and third translational axes and the three rotational axes but not along the first translation axis.

Example 5b. The robotic system of example 4b, wherein: the axial load sensor is configured to sense the axial force transmitted along an axial sensing axis; the axial sensing axis is generally parallel to the first translational axis.

As used herein, "generally parallel" is within +/−5 degree of parallel.

Example 6b. The robotic system of example 5b, wherein the axial sensing axis is not colinear with the first translational axis.

Example 7b. The robotic system of example 5b, wherein the axial sensing axis does not intersect the first axis.

Example 7.5b The robotic system of example 5b, wherein: the axial sensing axis intersects the first and second brackets and the axial load sensor; the axial load sensor is between the first and second brackets.

Example 8b. The robotic system of example 1b, wherein the axial load sensor is not coupled to a Wheatstone bridge and does not include a Wheatstone bridge.

Example 8.1b The robotic system according to any of examples 1b-7.5b, wherein the axial load sensor is not coupled to a Wheatstone bridge and does not include a Wheatstone bridge.

Example 9b. The robotic system of example 1b, wherein the first and second brackets are not monolithic with each other.

Example 9.1b The robotic system according to any of examples 1b-8b, wherein the first and second brackets are not monolithic with each other.

Example 10b. The robotic system of example 1b, wherein the first and second brackets are each statically coupled to the axial load sensor and to the housing.

Example 10.1b The robotic system according to any of examples 1b-9b, wherein the first and second brackets are each statically coupled to the axial load sensor and to the housing.

Example 11b. The robotic system of example 1b, wherein neither of the first or second brackets is slidingly coupled to the housing.

Example 11b. The robotic system according to any of examples 1b-10b, wherein neither of the first or second brackets is slidingly coupled to the housing.

Example 12b. The robotic system of example 1b, wherein: the first bracket has first and second faces that are planar and which oppose each other; the first and second faces of the first arm are generally rectilinear in shape; the second bracket has first and second faces that are planar and which oppose each other; the first and second faces of the second arm are generally rectilinear in shape.

Example 12.1b The robotic system according to any of examples 1b-11b, wherein: the first bracket has first and second faces that are planar and which oppose each other; the first and second faces of the first arm are generally rectilinear in shape; the second bracket has first and second faces that are planar and which oppose each other; the first and second faces of the second arm are generally rectilinear in shape.

Example 13b. The robotic system of example 12b, wherein: the first and second faces of the first bracket are parallel to each other; the first and second faces of the second bracket are parallel to each other; the first face of the first bracket is orthogonal to the first face of the second bracket.

Example 14b. The robotic system of example 13b, wherein: the first bracket includes at least one of titanium, aluminum, or combinations thereof; the second bracket includes at least one of titanium, aluminum, or combinations thereof.

Example 14.1b The robotic system according to any of examples 1b-13b, wherein: the first bracket includes at least one of titanium, aluminum, or combinations thereof; the second bracket includes at least one of titanium, aluminum, or combinations thereof.

The foregoing description of the embodiments of the invention has been presented for the purposes of illustration and description. It is not intended to be exhaustive or to limit the invention to the precise forms disclosed. This description and the claims following include terms, such as left, right, top, bottom, over, under, upper, lower, first, second, etc. that are used for descriptive purposes only and are not to be construed as limiting. For example, terms designating relative vertical position refer to a situation where a side of a substrate is the "top" surface of that substrate; the substrate may actually be in any orientation so that a "top" side of a substrate may be lower than the "bottom" side in a standard terrestrial frame of reference and still fall within the meaning of the term "top." The term "on" as used herein (including in the claims) does not indicate that a first layer "on" a second layer is directly on and in immediate contact with the second layer unless such is specifically stated; there may be a third layer or other structure between the first layer and the second layer on the first layer. The embodiments of a device or article described herein can be manufactured, used, or shipped in a number of positions and orientations. Persons skilled in the relevant art can appreciate that many modifications and variations are possible in light of the above teaching. Persons skilled in the art will recognize various equivalent combinations and substitutions for various components shown in the Figures. It is therefore intended that the scope of the invention be limited not by this detailed description, but rather by the claims appended hereto.

What is claimed is:

1. An exoskeleton robotic system comprising:
a first linkage and a second linkage;
a bearing coupled to the first linkage;
a joint coupling the first linkage to the second linkage, the joint including a motor configured to rotate the first linkage about the bearing;
an axial load sensor configured to sense an axial force transmitted to the axial load sensor via the joint in response to the motor rotating the first linkage, the axial force including one of tension or compression but not torque;
a bracket including first and second bracket locations and first, second, and third arms; and
a housing that includes at least part of the joint and which couples the bracket to the bearing;
wherein (a) the bracket couples to the housing at the first bracket location and couples to the axial load sensor at the second bracket location; (b) the first arm couples both of the second and third arms to the first bracket location; (c) each of the second and third arms couple the first arm to the second bracket location; and (d) the bracket is a compliant mechanism having compliance about three rotational axes and along two translational axes but not a third translational axis.

2. The robotic system of claim 1, wherein:
the compliant mechanism includes first, second, and third compliant mechanisms;
the first arm is the first compliant mechanism and is more compliant in a first direction than a second direction;
the second arm is the second compliant mechanism and is more compliant in the second direction than the first direction;
the third arm is the third compliant mechanism and is more compliant in the second direction than the first direction; and
the first direction is orthogonal to the second direction.

3. The robotic system of claim 1, wherein:
the first arm is more compliant in a first direction than a second direction;
the second arm is more compliant in the second direction than the first direction;

the third arm is more compliant in the second direction than the first direction; and the first direction is orthogonal to the second direction.

4. The robotic system of claim 1, wherein:

the axial load sensor is configured to sense the axial force transmitted along an axial sensing axis;

the axial sensing axis is parallel to the third translational axis.

5. The robotic system of claim 4, wherein the axial sensing axis is colinear with the third translational axis.

6. The robotic system of claim 4, wherein:

the motor is configured to rotate the first linkage about a rotation axis; and the axial sensing axis does not intersect the rotation axis.

7. The robotic system of claim 6, wherein the axial load sensor senses reaction torque of rotation of the first linkage in response to the axial sensing axis not intersecting the rotation axis.

8. The robotic system of claim 1, wherein:

the axial load sensor is not a torque load cell; and the axial load sensor is not coupled to a Wheatstone bridge and does not include a Wheatstone bridge.

9. The robotic system of claim 1, wherein the bracket is monolithic.

10. The robotic system of claim 1, wherein the bracket is statically coupled to the axial load sensor and is statically coupled to the housing.

11. The robotic system of claim 1, wherein the bracket is not slidingly coupled to the housing.

12. The robotic system of claim 1, wherein:

the first arm is configured to be in tension when the second arm is in compression; and the first arm is configured to be in compression when the second arm is in tension.

13. The robotic system of claim 12, wherein:

the first arm has first and second faces that are planar and which oppose each other;

the first and second faces of the first arm are generally rectilinear in shape;

the second arm has first and second faces that are planar and which oppose each other;

the first and second faces of the second arm are generally rectilinear in shape.

14. The robotic system of claim 13, wherein:

the first and second faces of the first arm are parallel to each other;

the first and second faces of the second arm are parallel to each other;

the first face of the first arm is orthogonal to the first face of the second arm.

15. The robotic system of claim 14, wherein:

the first arm includes at least one of titanium, aluminum, or combinations thereof;

the second arm includes at least one of titanium, aluminum, or combinations thereof.

16. An exoskeleton robotic system comprising:

a linkage;

a bearing coupled to the linkage;

a joint including a motor configured to move the linkage along the bearing;

an axial load sensor configured to sense an axial force transmitted to the axial load sensor via the joint in response to the motor moving the linkage along the bearing, the axial force including one of tension or compression;

a bracket including first and second bracket locations and first and second arms; and a housing that includes at least part of the joint and which couples the bracket to the bearing;

wherein (a) the bracket couples to the housing at the first bracket location and couples to the axial load sensor at the second bracket location; (b) the first arm couples the second arm to the first bracket location; and (c) the second arm couples the first arm to the second bracket location; and (d) the bracket is a compliant mechanism having compliance about three rotational axes and along two translational axes but not a third translational axis.

17. The robotic system of claim 16, wherein:

the axial load sensor is configured to sense the axial force transmitted along an axial sensing axis;

the axial sensing axis is parallel to the third translational axis.

18. The robotic system of claim 17, wherein the axial sensing axis is colinear with the third translational axis.

19. The robotic system of claim 17, wherein:

the motor is configured to rotate the linkage about a rotation axis; and the axial sensing axis does not intersect the rotation axis.

20. The robotic system of claim 19, wherein the axial load sensor senses reaction torque of rotation of the linkage in response to the axial sensing axis not intersecting the rotation axis.

21. The robotic system of claim 16, wherein:

the axial load sensor is not a torque load cell; and the axial load sensor is not coupled to a Wheatstone bridge and does not include a Wheatstone bridge.

22. The robotic system of claim 16, wherein the bracket is statically coupled to the axial load sensor and is statically coupled to the housing.

23. The robotic system of claim 16, wherein:

the first arm is configured to be in tension when the second arm is in compression; and the first arm is configured to be in compression when the second arm is in tension.

* * * * *